US007765526B2

(12) United States Patent
Chen et al.

(10) Patent No.: US 7,765,526 B2
(45) Date of Patent: Jul. 27, 2010

(54) MANAGEMENT OF WATCHPOINTS IN DEBUGGERS

(75) Inventors: Chih-Ping Chen, Nashua, NH (US); Jeffrey V. Olivier, Champaign, IL (US); Jay P. Hoeflinger, Urbana, IL (US); Bevin R. Brett, Brookline, NH (US)

(73) Assignee: Intel Corporation, Santa Clara, CA (US)

( * ) Notice: Subject to any disclaimer, the term of this patent is extended or adjusted under 35 U.S.C. 154(b) by 1335 days.

(21) Appl. No.: 11/241,606

(22) Filed: Sep. 30, 2005

(65) Prior Publication Data

US 2007/0079292 A1  Apr. 5, 2007

(51) Int. Cl.
*G06F 9/44* (2006.01)
(52) U.S. Cl. ...................... 717/124; 717/127
(58) Field of Classification Search .................. 717/124, 717/127
See application file for complete search history.

(56) References Cited

U.S. PATENT DOCUMENTS

| | | | | |
|---|---|---|---|---|
| 5,611,043 | A * | 3/1997 | Even et al. ..................... 714/38 |
| 6,557,119 | B1 * | 4/2003 | Edwards et al. ............... 714/38 |
| 6,634,020 | B1 * | 10/2003 | Bates et al. .................. 717/131 |
| 7,047,520 | B2 * | 5/2006 | Moore et al. ................. 717/129 |
| 2002/0174416 | A1 * | 11/2002 | Bates et al. .................. 717/128 |
| 2003/0208746 | A1 * | 11/2003 | Bates et al. .................. 717/129 |
| 2003/0221186 | A1 * | 11/2003 | Bates et al. .................. 717/125 |
| 2004/0205720 | A1 * | 10/2004 | Hundt .......................... 717/124 |
| 2005/0066313 | A1 * | 3/2005 | Bates et al. .................. 717/129 |
| 2005/0172272 | A1 * | 8/2005 | Bates et al. .................. 717/129 |
| 2008/0216054 | A1 * | 9/2008 | Bates et al. .................. 717/125 |

OTHER PUBLICATIONS

Cownie, J. & W. Gropp, "A Standard Interface for Debugger Access to Message Queue Information in MPI", *Proceedings of PVMMPI*, 1999, pp. 51-58.
Jarymowycz, N.M., "Valid Debugging for Distributed Shared Memory", [online], Apr. 29, 2002, [Retrieved on Sep. 26, 2005], retrieved from the Internet at <URL: http://www.cs.wm.edu/~kearns/dissertations.d/natasha_proposal.pdf.>.
"MPI Debugger Interface", [online], [Retrieved on Sep. 26, 2005], retrieved from the Internet at <URL: http//www-unix.mcs.anl.gov/mpi/mpi-debug/>.

* cited by examiner

*Primary Examiner*—Anna Deng
(74) *Attorney, Agent, or Firm*—Konrad Raynes & Victor LLP; Rabindranath Dutta (57) ABSTRACT

Provided are a method, system, and article of manufacture, wherein a first application requests an operating system to monitor a memory address, and wherein the operating system generates a signal in response to an operation that affects the memory address. A second application receives the generated signal. The second application determines whether to forward the signal to the first application. The first application processes the signal, in response to the signal being forwarded by the second application.

18 Claims, 7 Drawing Sheets

MANAGEMENT OF WATCHPOINTS IN DEBUGGERS

BACKGROUND

A debugger is a software program that allows a user to debug other software programs. A user may initiate a debug session by starting up the debugger with the program being debugged, where the program being debugged may be referred to as the debuggee. The user may then set one or more breakpoints in the debuggee. A breakpoint is a mechanism to pause the debuggee when at least one condition associated with the breakpoint becomes true.

After setting the one or more breakpoints, the user may continue with the execution of the debuggee. When the debuggee is paused at a breakpoint, the user may check the debuggee's internal state, such as register values, memory values, and the call stack, to determine the cause of one or more bugs in the debuggee, where a bug is a defect in the debuggee. The user may set additional breakpoints, continue the execution of the debuggee, and check the debuggee's internal state in an attempt to determine the cause of the one or more bugs.

A watchpoint is a breakpoint that is triggered when the content of a specified memory address changes. A watchpoint may be implemented by changing the access protection of the page in which the specified memory address is located. For example, if the user sets a watchpoint to monitor writes to a variable, the page where the variable resides would be set to read-only protection. When the page is written into, the operating system may deliver a fault signal that indicates a page access violation. As a result, the debuggee may be paused. The page access violation may be referred to as a segmentation violation (SEGV). The debugger may receive the fault signal and determine the memory address where the write failed. The debugger may then change the protection of the page back to write-allowed and single step the instruction that resulted in the fault signal. When the single stepping completes (whether the single stepping succeeds or not), the debugger may reset the protection on the page to read-only to identify additional subsequent writes to the memory address. If the single stepping succeeds, the debugger either notifies the user of a watchpoint hit if the address falls within the memory address corresponding to a watchpoint, or resumes the debuggee if the address falls outside the memory address corresponding to any watchpoints. If the single stepping fails, then the debugger may report that a program error has occurred. A debugger that uses memory protection to handle watchpoints may be referred to as an "SEGV debugger".

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A runtime is a software module that defines an application programming interface (API), where the runtime may be linked to a user program. Certain runtimes install a signal handler to receive SEGV signals from the operating system, and modify page protections. Such runtimes may cause problems for a debugger that uses page protections for watchpoints. A runtime that installs signal handlers for SEGV signals, may be referred to as a "SEGV runtime".

An interface library loaded into the debugger's address space may be used when debugging a program using a runtime to provide an interface through which the runtime and the debugger interact. A SEGV debugger may not work properly with a SEGV runtime because they both expect to receive all SEGV signals. Furthermore, if either the debugger or the runtime changes protections on a page without considering protections set by the other, the operation of the other may be affected. Certain embodiments allow a SEGV debugger to debug an application that is executed within a SEGV runtime.

Figure 1:
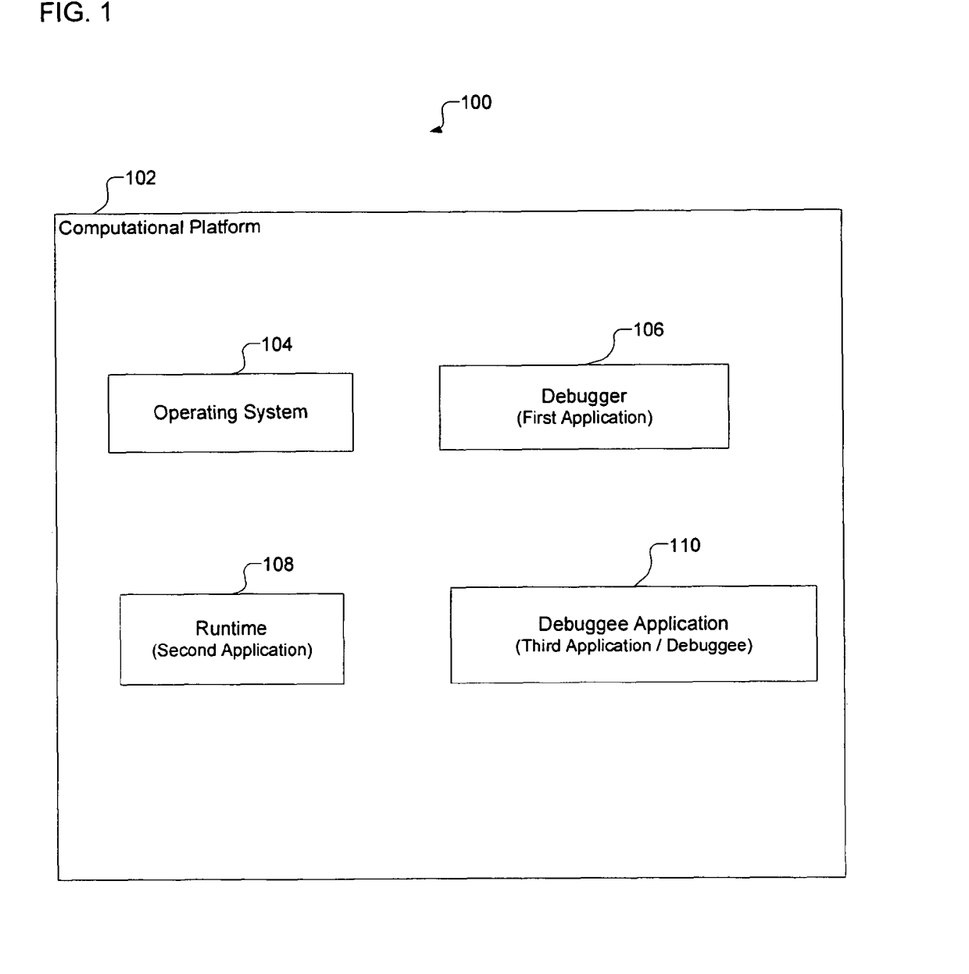
FIG. 1 illustrates a computing environment, in accordance with certain embodiments.

FIG. 1 illustrates a computing environment 100, in accordance with certain embodiments. A computational platform 102 is included in the computing environment 100, where the computational platform 102 may be any suitable device including those presently known in the art, such as, a personal computer, a workstation, a server, a mainframe, a portable computer, a hand held computer, a palm top computer, a telephony device, a network appliance, a blade computer, a storage server, etc. The computational platform 102 may be coupled to a network (not shown), where the network may comprise the Internet, an intranet, a Local area network (LAN), a Storage area network (SAN), a Wide area network (WAN), a wireless network, etc.

The computational platform 102 includes an operating system 104, a first application comprising a debugger 106, and a second application comprising a runtime 108, and a third application comprising a debuggee application 110, also referred to as a debuggee.

The operating system 104 may be any suitable operating system including those presently known in the art, such as, MICROSOFT WINDOWS*, UNIX*, etc. The debugger 106 is any application that may be used to debug the debuggee 110, wherein debugging the debuggee 110 may include determining the causes of faults, traps, and other errors caused by the execution of the debuggee in the runtime 108. In certain embodiments, the runtime 108 is a SEGV runtime and the debugger 106 is a SEGV debugger.

Certain embodiments illustrated in FIG. 1, allow the debugger 106 to debug the debuggee application 110 that executes within the runtime 108.

Figure 2:
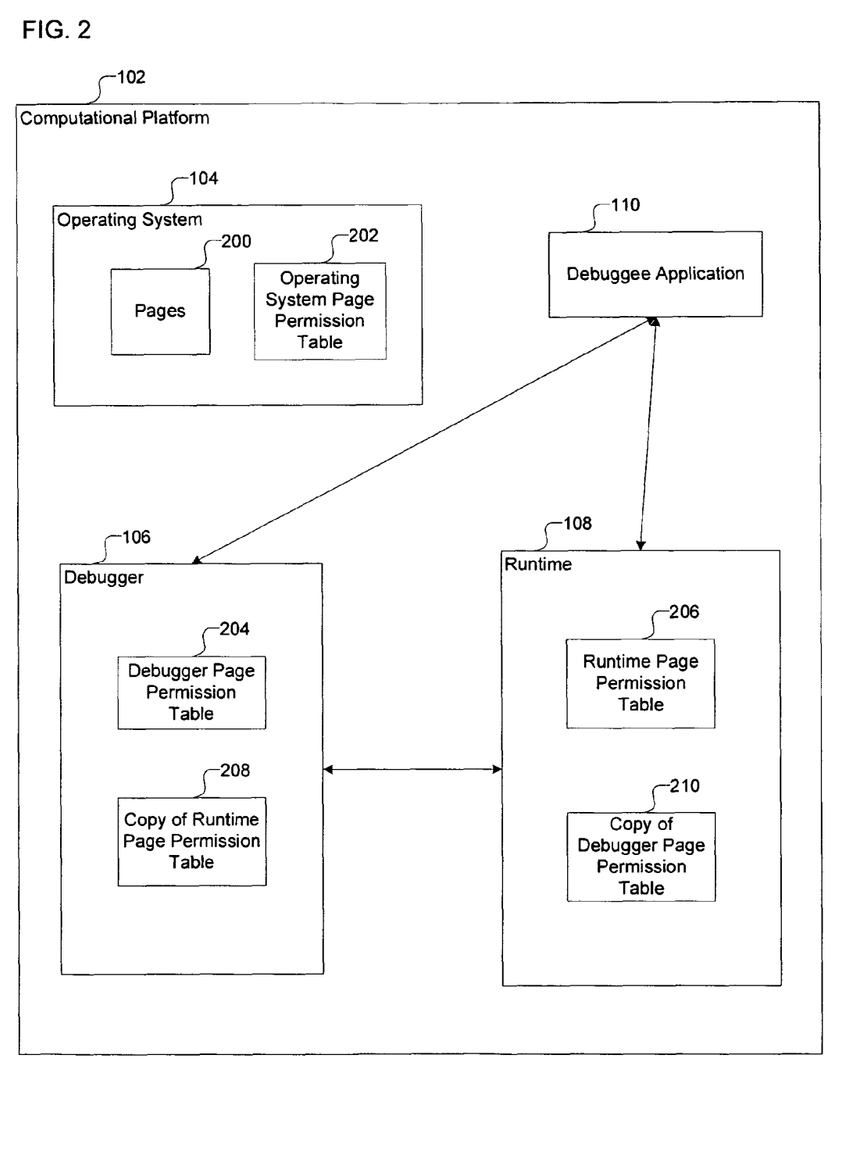
FIG. 2 illustrates a block diagram that includes data structures implemented in the computing environment of FIG. 1, in accordance with certain embodiments.

FIG. 2 illustrates a block diagram that includes data structures implemented in the computational platform 102 included in the computing environment 100 of FIG. 1, in accordance with certain embodiments.

In certain embodiments, the operating system 104 included in the computational platform 102 stores pages 200, where each page may include a plurality of memory addresses. An operating system page permission table 202 includes indicators that indicate the protections on the pages 200. For example, a page "X" may be indicated as having the protection "Read Only". In such a case, if an instruction attempts to execute a write operation on any memory address included in the page "X", a segmentation violation signal may be generated by the operating system 104.

In certain embodiments, the debugger 106 includes a debugger page permission table 204, and the runtime 108 includes a runtime page permission table 206. The debugger page permission table 204 includes indicators that indicate the protections on one or more of the pages 200 as set by the debugger 106. For example, the debugger 106 may set a watchpoint corresponding to a memory address included in page "X" and indicate in the debugger page permission table 204 that the page "X" has the protection "Read Only".

The runtime page permission table 206 includes indicators that indicate the protections on one or more of the pages 200 as set by the runtime 108. For example, the runtime 108 may indicate the protection of the page "X" to be "Read/Write" in the runtime page permission table 206.

In certain embodiments, the debugger 106 executes the debuggee 110 in the execution environment provided by the runtime 108. The debugger 106 sets watchpoints to debug the debuggee 110. In certain embodiments, a copy 208 of the runtime page permission table 206 is maintained in the debugger 106, and a copy 210 of the debugger page permission table 204 is maintained in the runtime 108. In certain alternative embodiments, instead of maintaining the copies 208, 210, interfaces that read the debugger page permission table 204 from the runtime 108 and interfaces that read the runtime page permission table 206 from the debugger 106 may be implemented.

In addition to the data structures illustrated in FIG. 2, additional data structures that allow the debugger 106 to interface with the runtime 108 and the debuggee 110, and the runtime 108 to interface with the debugger 106 and the debuggee 110 may also be present. In still other embodiments, data structures that are different from tables may be used to implement the operating system page permission table 202, the debugger page permission table 204, and the runtime page permission table 206. Additionally, in certain embodiments a fewer or a greater number of tables may include the information maintained in the operating system page permission table 202, the debugger page permission table 204, and the runtime page permission table 206.

In certain embodiments illustrated in FIG. 2, the operating system page permission table 202 includes for a page the more restrictive of the protection indicated for the page by the debugger 106 and the runtime 108.

Figure 3:
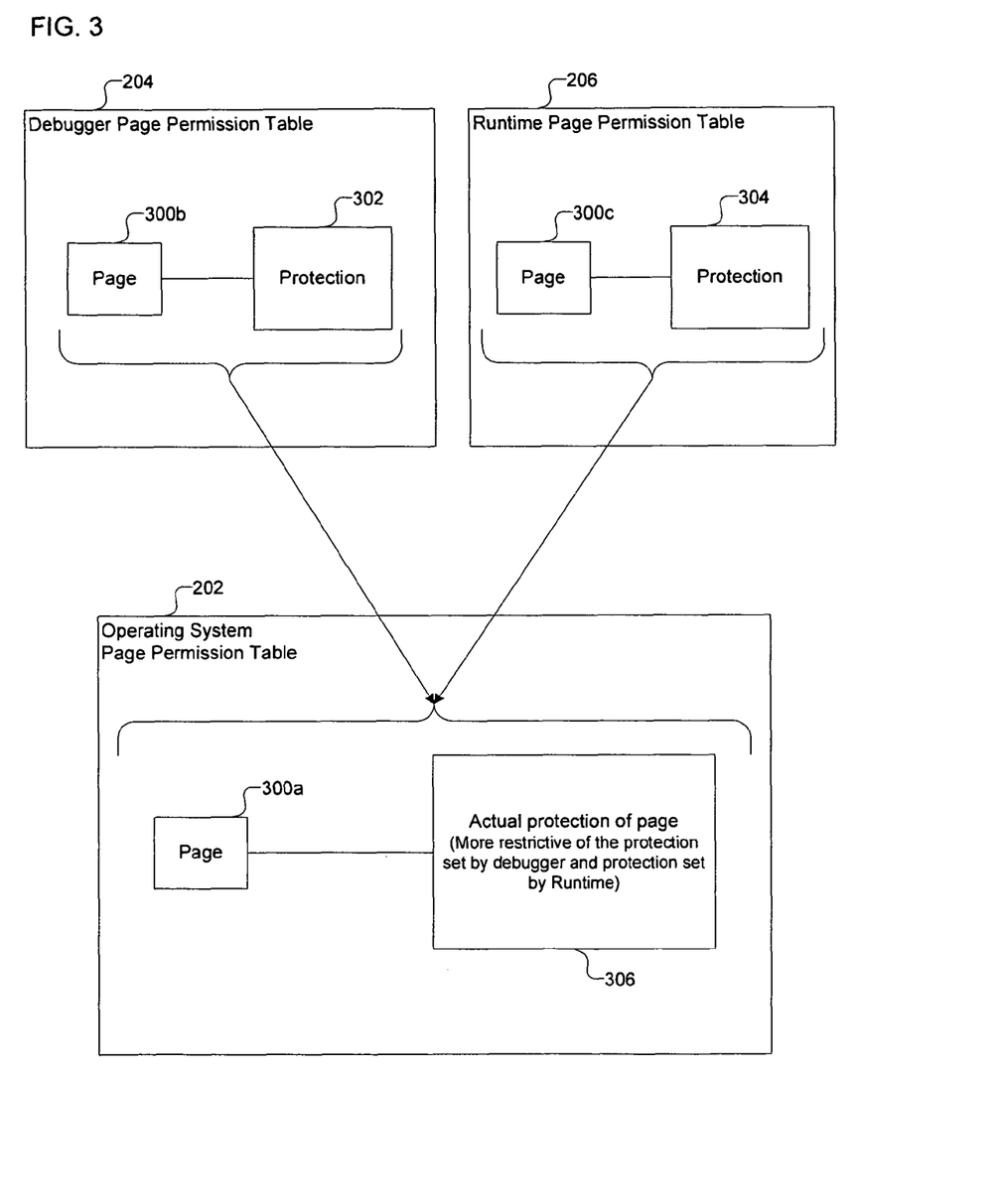
FIG. 3 illustrates a block diagram that indicates how permissions tables for protecting a page are maintained, in accordance with certain embodiments.

FIG. 3 illustrates a block diagram that indicates how permission tables for protecting a page are maintained in the computational platform 102, in accordance with certain embodiments.

In certain embodiments illustrated in FIG. 3, a certain page 300a maintained by the operating system 202 is referred to as page 300b in the debugger page permission table 204 and is referred to as page 300c in the runtime page permission table 206.

The debugger 106 may set protection 302 for the page 300b, where the protection 302 is indicated in the debugger page permission table 204. The runtime 108 may set protection 304 for the page 300c, where the protection 304 is indicated in the runtime page permission table 206.

The actual protection 306 of the page 300a as indicated in the operating system page permission table 202 is set to the more restrictive of the protections set by the debugger 106 and the runtime 108, i.e., the more restrictive of the two protections 302, 304 is set as the protection 306 of the page 300a maintained by the operating system 104.

Certain embodiments illustrated in FIG. 3, show how the more restrictive of the protections 302, 304 for a page, as set in the debugger page permission table 204 and the runtime page permission table 206, is set as the protection 306 for the page by the operating system 104.

Figure 4:
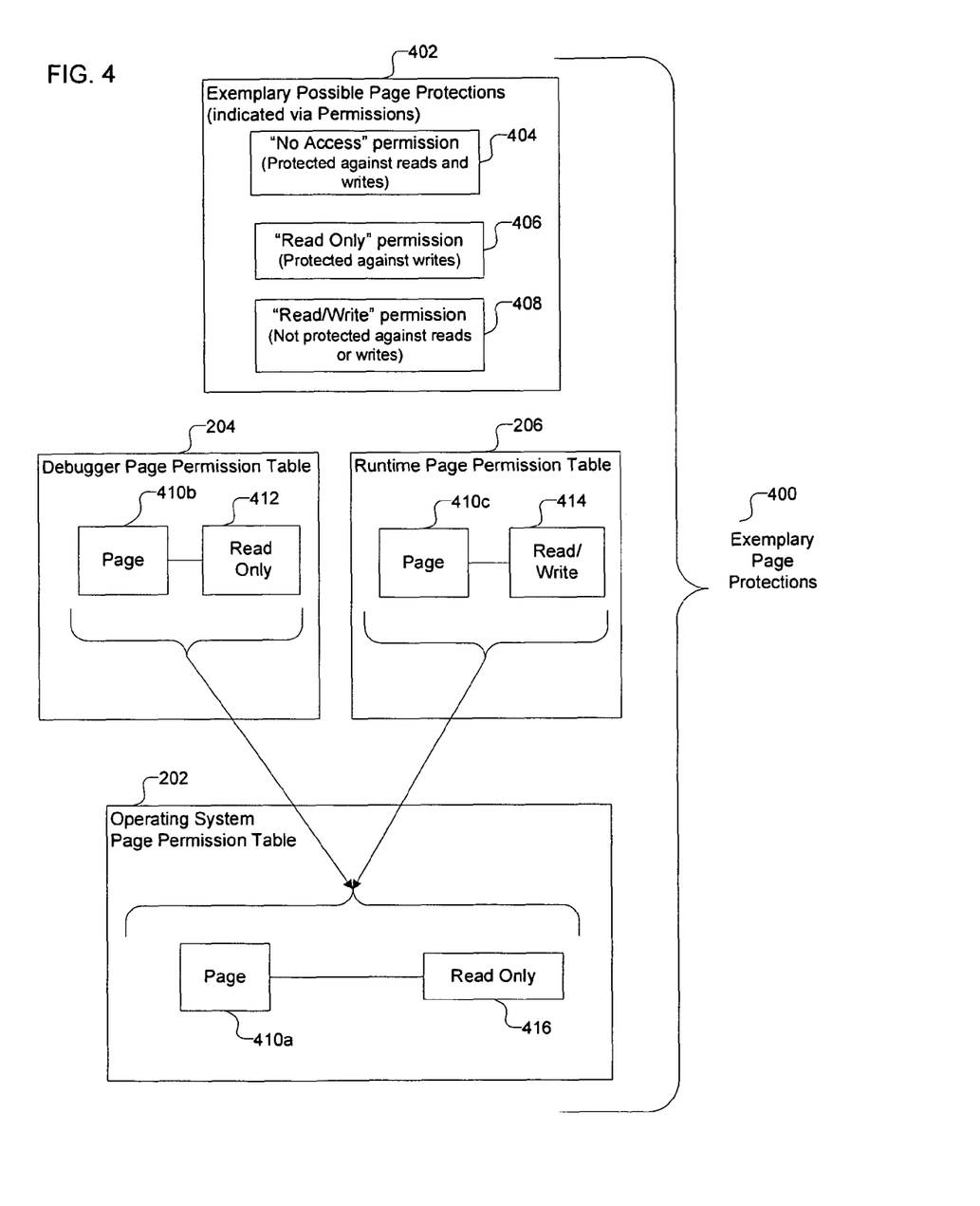
FIG. 4 illustrates a block diagram that indicates exemplary page protections, in accordance with certain embodiments.

FIG. 4 illustrates a block diagram that indicates exemplary page protections 400, in accordance with certain embodiments. Embodiments for the exemplary page protections 400 may be implemented in the computational platform 102 of FIG. 1.

In certain embodiments, protection for a page may be implemented by an indicator that indicates protections that apply to the page. For example, a page may be indicated as being protected against reads and writes. Alternatively, in certain embodiments protection for a page may be implemented by an indicator that indicates permissions granted for performing operations on the page. For example, a page that is protected against reads and writes may be indicated as having "no access" permission. In FIG. 4, the exemplary page protections 402 have been shown to be implemented by indicating permissions that apply to a page. Other embodiments may implement protections for a page via different indicators or by indicators that explicitly indicate the protections.

In certain embodiments, the exemplary possible page protections 402 implemented for a page may include "No Access" 404, "Read Only" 406, and "Read/Write" 408. If a page protection for a page is indicated as "No Access" 404, then neither read nor write operations may be performed on the page, i.e., the page is protected against reads and writes. If a page protection for a page is indicated as "Read Only" 406, then read operations may be performed on the page, but no write operations may be performed on the page, i.e., the page is protected against writes. Additionally, if a page protection for a page is indicated as "Read/Write" 408 then both read and write operations may be performed on the page, i.e., the page is not protected against either reads or writes. Therefore, in the exemplary possible page protections 402, "No Access" 404 indicates a more restrictive protection than "Read Only" 406, and "Read Only" 406 indicates a more restrictive protection than "Read/Write" 408.

A page 410a maintained by the operating system 104 may be referred to as the page 410b within the debugger page permission table 204, and the as the page 410c within the runtime page permission table 206. The debugger page permission table 204 may indicate the page 410b to be "Read Only" 412, and the runtime page permission table 206 may indicated the page 410c to be "Read/Write" 414. In such a case, the more restrictive protection for the page 410b, 410c is the "Read Only" 412 protection. The page 410a corresponding to pages 410b, 410c is indicated to have the more restrictive of the "Read Only" 412 and the "Read/Write" 414 protections. The protection for page 410a is indicated as "Read Only" 416 in the operating system permission table 202.

Certain embodiments illustrated in FIG. 4 indicate how the more restrictive of the page protections for a page set by the debugger 106 and the runtime 108 is maintained for the operating system 104. In case a page protection is violated, the operating system 104 may generate a signal, such as a SEGV signal.

Figure 5:
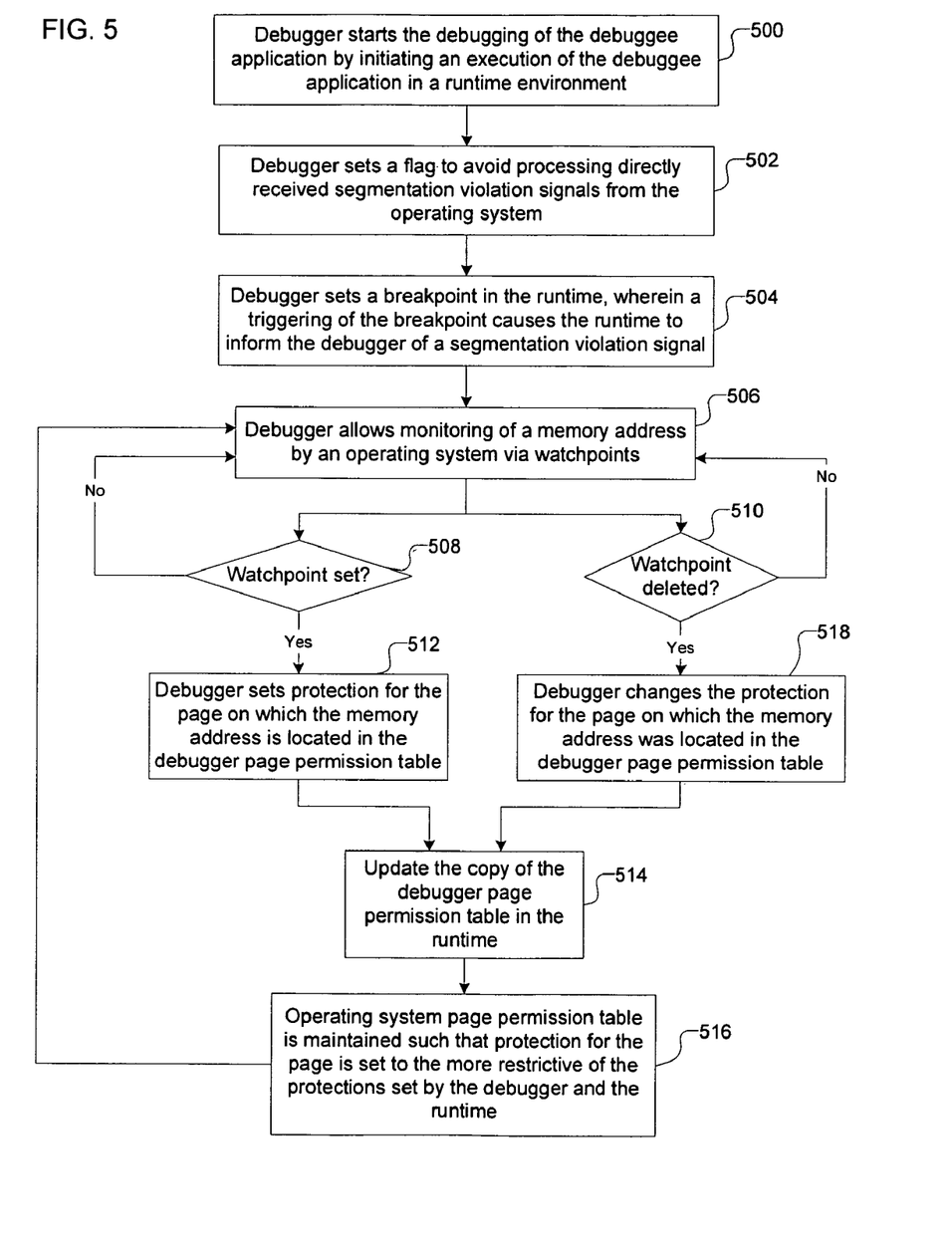
FIG. 5 illustrates first operations for managing watchpoints, in accordance with certain embodiments.

FIG. 5 illustrates first operations for managing watchpoints, in accordance with certain embodiments. The operations illustrated in FIG. 5 may be implemented in the computational platform 102.

Control starts at block 500 where the debugger 106 starts the debugging of the debuggee application 110 by initiating an execution of the debuggee application 110 within the runtime environment provided by the runtime 108. The debuggee application 110 may execute by using the runtime libraries provided by the runtime 108. When a signal, such as, a segmentation violation signal, is generated during the execution of the debuggee application 110, the signal is transmitted by the operating system 104 to the debugger 106 and the runtime 108. A signal is an indication of a fault, trap, violation, or other error that is caused during the execution of a computer program.

The debugger 106 sets (at block 502) a flag to avoid processing segmentation violation signals that are received by the debugger 106 directly from the operating system 104. In certain embodiments the flag may be set to ignore segmentation violation signals received directly by the debugger 106 from the operating system 104. In certain embodiments, data structures that are different from a flag may be used to avoid processing segmentation violation signals that are received by the debugger 106 directly from the operating system 104.

Additionally, the debugger 106 sets (at block 504) a breakpoint in the runtime 108, where the triggering of the breakpoint may cause the runtime 108 to send the debugger 106 a notification of a segmentation violation signal received from the operating system 104, where the segmentation violation signal may require further processing by the debugger 106. For example, the debugger 106 may set a breakpoint in a function named "inform_debugger_of_segv_event" in the runtime 108. When the runtime 108 receives a segmentation violation signal from the operating system 104, the breakpoint in the function named informed_debugger_of_segv event may be triggered, allowing the runtime 108 to send to the debugger 106 the segmentation violation signal.

Control proceeds to block 506, where the debugger 106 may allow the monitoring of one or more memory addresses by the operating system 104 via one or more watchpoints set by a user. For example, a user may set a watchpoint while debugging the debuggee application 110, where the watchpoint is for monitoring a memory address. Subsequently, the user may delete the watchpoint.

From block 506, control may proceed either to block 508 or to block 510. At block 508, the debugger 106 determines whether a watchpoint has been set by a user. If so, the debugger 106 sets protection for the page on which the memory address corresponding to the watchpoint is located. The protection is set in the debugger page permission table 204. The debugger 106 or the runtime 108 may then cause an update (at block 514) of the copy 210 of the debugger page permission table 204 in the runtime 108. The operating system page permission table 202 is maintained (at block 516), such that the protection for the page on which the memory address corresponding to the watchpoint is located is set to the more restrictive of the protections set by the debugger 106 and the runtime 108. From block 516, control returns to block 506, for further monitoring of memory addresses by the debugger 106.

If the user deletes (at block 510) a watchpoint, then the debugger 106 changes the protection for the page on which the memory address was located. The change in protection is made in the debugger page permission table 204. In certain embodiments the debugger 106 may remove a page from the debugger page permission table 204 if the page does not include at a memory address associated with at least one watchpoint. The copy 210 of the debugger page permission table 204 is updated (at block 514) and the operating system page permission table is maintained (at block 516) such that protection for the page is set to the more restrictive of the protections set by the debugger 106 and the runtime 108. From block 516, control returns in to block 506, for further monitoring of memory addresses by the debugger 106.

If a watchpoint is not set (at block 508) or a watchpoint is not deleted (at block 510) then control returns to block 506, for further monitoring of memory addresses by the debugger 106.

Certain embodiments illustrated in FIG. 5 allows a user to set or delete a watchpoint by a debugger 106 that is being used to debug a debuggee application 110. When a watchpoint is set or deleted, the debugger page permission table 204 in the debugger 106, the copy 210 of the debugger page permission table in the runtime 108, and the operating system page permission table 202 are updated, such that the protection for the page corresponding to the memory address for which the watchpoint is set or deleted is the more restrictive of the protections set by the debugger 106 and the runtime 108. While blocks 500-518 are being executed, the runtime 108 may also set protections on various pages and store the protections in the runtime page permission table 206, where a copy 208 of the runtime page permission table 206 is maintained in the debugger 106. The setting and deletion of watchpoints illustrated in FIG. 5 may be performed before, during, or after the processing of segmentation violations by the runtime 108 and the debugger 106.

Figure 6:
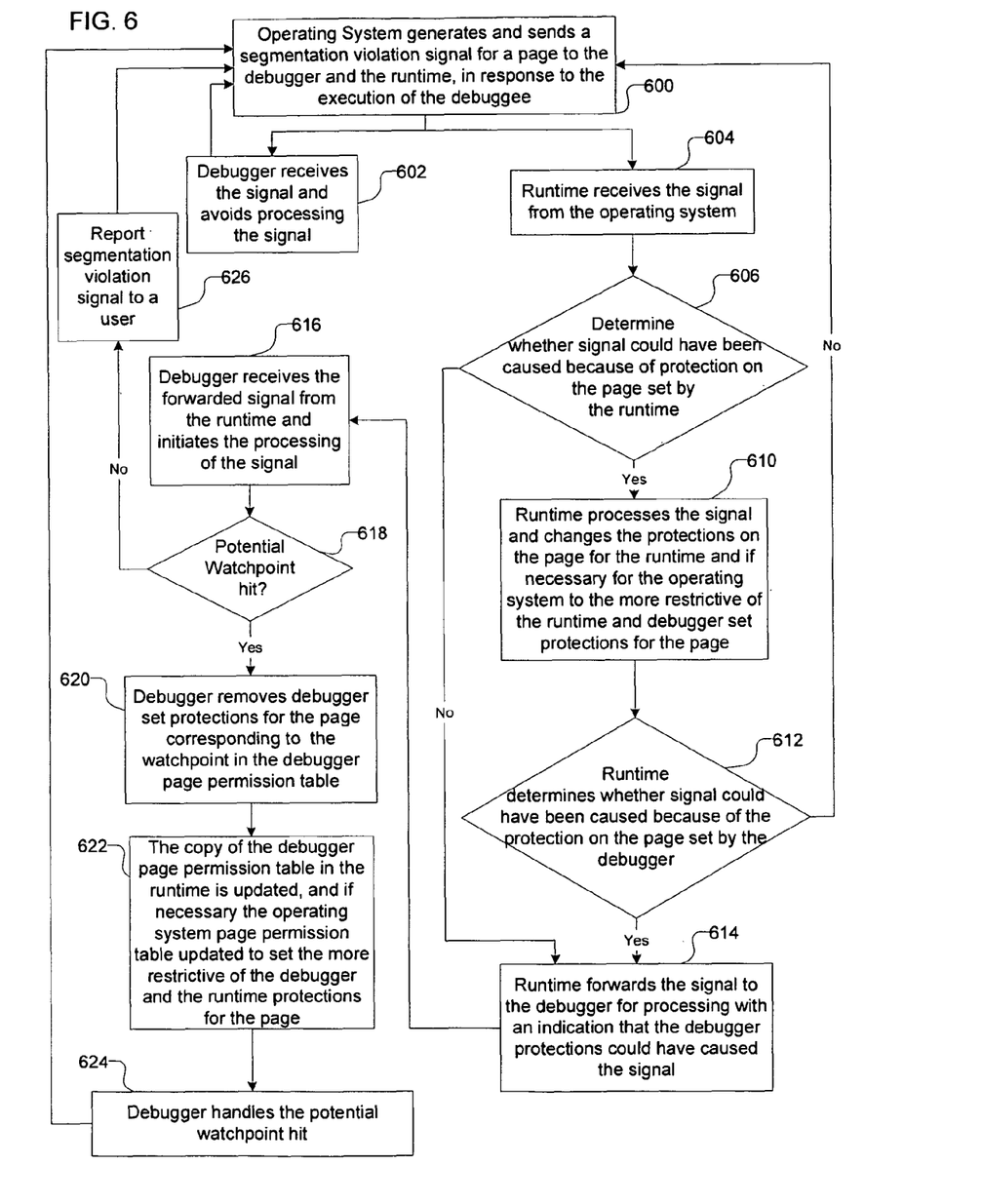
FIG. 6 illustrates second operations for managing watchpoints, in accordance with certain embodiments.

FIG. 6 illustrates second operations for managing watchpoints, in accordance with certain embodiments. The operations illustrated in FIG. 6 may be implemented in the computational platform 102.

Control starts at block 600, where the operating system 104 generates and sends a segmentation violation signal for a page to the debugger 106 and the runtime 108, in response to the execution of the debuggee application 110. The segmentation violation signal may be generated by the operating system 104, in response to an operation violating the protection that has been set for the page. In certain embodiments, the protection for the page may have been set either by the debugger 106 or by the runtime 108, or by both the debugger 106 and the runtime 108.

Control proceeds in parallel to blocks 602 and 604, where in block 602 the debugger 106 receives the segmentation violation signal and avoids processing the signal because the flag to avoid processing directly received segmentation violation signals was set in the debugger at block 502 of FIG. 5. After the debugger 106 receives (at block 602) the segmentation violation signal directly from the operating system 104 and avoids processing the signal, control returns to block 600, where additional segmentation violation signals may be generated by the operating system 104.

The runtime 108 receives (at block 604) the segmentation violation signal for a page from the operating system 104. The runtime 108 determines (at block 606) whether the signal could have been caused because of the protection on the page set by the runtime 108. If so, the runtime 108 processes (at block 610) the segmentation violation signal and if necessary changes the protection on the page for the runtime 108 and if necessary the protection on the page for the operating system 104, such that the protection on the page for the operating system 104 is the more restrictive of the protections set by the debugger 106 and the runtime 108 for the page. The copy 208 of the runtime page permission table that is maintained on the debugger 106 may also be updated.

The runtime 108 determines (at block 612) whether the segmentation violation signal could have been caused because of the protection on the page set by the debugger. If so, then the breakpoint set (at block 504 of FIG. 5) by the debugger 106 in the runtime 108 is triggered, and the runtime 108 forwards (at block 614) the segmentation violation signal to the debugger 106 for processing, and may also optionally send an indication that the debugger 106 set protections could have caused the segmentation violation signal. When the runtime 108 communicates the segmentation violation signal to the debugger 106, the debuggee application 110 stops because of the triggering of the breakpoint set (at block 504 of FIG. 5) by the debugger 106.

The debugger 106 receives (at block 616) the forwarded segmentation violation signal from the runtime 108 and initiates the processing of the segmentation violation signal to determine (at block 618) whether a watchpoint set by the user has been hit. In certain embodiments, on receiving the forwarded segmentation violation signal the debugger 106 may call a function to process the breakpoint set in the runtime 108 by the debugger 106, and the function called by the debugger processes the segmentation violation signal. The function may report an error in the debuggee application 110 if the address that generated the segmentation violation signal is not on a page that is being watched, or if a segmentation violation occurs when the debuggee application 110 is being single stepped by the debugger 106. Otherwise, the instruction being processed is a potential hit on a watchpoint, i.e., the segmentation violation may have been caused by a violation of the protection set by the debugger 106.

If a determination is made (at block 618) that a potential watchpoint has been hit then the debugger 106 removes (at block 620) the protection for the page previously set by the debugger 106, where the page corresponds to the memory address monitored via the watchpoint. The removal of the protection for the page previously set by the debugger 106 causes the debugger page permission table 204 to be updated in the debugger 106. The copy 210 of the debugger page permission table is updated (at block 622) in the runtime 108, and if necessary the operating system page permission table 202 is updated to set the more restrictive of the debugger 106 and the runtime 108 set protections for the page. The debugger 106 completes the handling (at block 624) of the potential watchpoint hit by setting up a single-stepping breakpoint, and single steps through the breakpoint to handle the watchpoint hit. Control returns to block 600 to handle the next segmentation violation signal. If a determination is made (at block 618) that a potential watchpoint has not been hit then a segmentation violation signal is reported (at block 626) to a user, and control returns to block 600 to handle the next segmentation violation signal.

If at block 606, the runtime 108 determines that the segmentation violation signal could not have been caused because of the protection on the page set by the runtime 108 then control proceeds to block 614, where the runtime 108 forwards the signal to the debugger 106 for processing. Additionally, if at block 612, the runtime 108 determines that the segmentation violation signal could not have been caused because of the protection on the page set by the debugger 106, then control returns to block 600.

In certain embodiments that have not been fully illustrated in FIG. 6, the debuggee application 110 may also raise a segmentation violation signal that is not caused by the protections set by the debugger 106 or the runtime 108. In such a case the segmentation violation signal raised by the debuggee application 110 is processed by the debugger 106. For example, in certain embodiments, when the runtime 108 receives a segmentation violation signal corresponding to an access to a page, the runtime 108 may check to determine if the runtime's own protections would have caused the segmentation violation signal. If so, the runtime 108 may handle the segmentation violation signal and change the protection of the page, but not to a value that is less protected than the protection set by the debugger 106 for the page. If the protection set by the debugger 106 would have caused the segmentation violation signal, or neither the runtime's nor the debugger's protection would have caused the segmentation violation signal, the runtime 108 may call a function "inform_debugger_of_segv_event" with the faulting address, the instruction pointer and the runtime permissions for the page. When the runtime calls the function inform_debugger_of_segv_event, the debuggee application 110 would stop because of a breakpoint set earlier. The debugger 106 may then call a function "handle_event" to process the breakpoint, which in turn may call a function "handle_SEGV". The function "handle_SEGV" may report an error in the debuggee application 110 if the faulting address is not on a page that is being watched, or if a segmentation violation occurs when the debuggee application 110 is single stepping an instruction. Otherwise, the current instruction may be a potential watchpoint hit. To handle a potential watchpoint hit, the debugger 106 may remove the protection for the watchpoint by changing the protection of the page to the protection of the runtime, set up a single-stepping breakpoint, and single step to handle the watchpoint.

Certain embodiments described in FIGS. 1-6, include a debugger 106, a runtime 108 and an interface library that couples the debugger 106 to the runtime 108. Certain embodiments allow the debugger 106 to debug a program, such as the debuggee application 110, where the debuggee application 110 is executed in an environment provided by the runtime 108.

In certain embodiments, the debugger 106 ignores all segmentation violation signals received directly from the operating system 104. The runtime 108 receives all segmentation violation signals 110 from the operating system 104 and determines the reason for the occurrence of the segmentation violation signal. If the segmentation violation signal is caused by a protection on a page set by the runtime 108, then the runtime 106 processes the segmentation violation signal. If the segmentation violation signal could also have been caused by the debugger 106, the runtime 108 forwards the segmentation violation signal to the debugger 106. Additionally, if the signal is not caused by a protection set by the runtime 108, then the segmentation violation signal is forwarded to the debugger 106 for processing. In certain embodiments, any protection applied to a page by the operating system 104 is the more restrictive of the protections for the page set by the debugger 106 and the runtime 108.

The runtime of certain distributed shared memory systems may install a segmentation violation handler to maintain the consistency of the shared memory model. Certain embodiments allow an application 110 that executes in a runtime 108 that has a segmentation violation handler to be debugged by a debugger 106 that sets watchpoints that cause segmentation violations.

Certain embodiments allow watchpoints to be used in a debugger 106 to debug a distributed shared memory application 110 within a runtime 108 that includes a segmentation violation handler. In certain embodiments, both the runtime 108 and the debugger 106 are implemented such that both are aware about the protections that the other has put on any pages that are monitored by both.

In alternative embodiments that may be implemented in certain operating systems, such as LINUX* or MICROSOFT WINDOWS*, the debugger 106 may see a segmentation violation signal before the runtime 108 sees the segmentation violation signal. The debugger 106 can then determine whether the debugger 106 is ignoring the segmentation violation signal (so that the runtime 108 can see the segmentation violation signal) or catching the segmentation violation signal (so that the runtime 108 never sees the segmentation violation signal).

The described techniques may be implemented as a method, apparatus or article of manufacture involving software, firmware, micro-code, hardware and/or any combination thereof. The term "article of manufacture" as used herein refers to program instructions, code and/or logic implemented in circuitry [e.g., an integrated circuit chip, Programmable Gate Array (PGA), Application Specific Integrated Circuit (ASIC), etc.] and/or a computer readable medium (e.g., magnetic storage medium, such as hard disk drive, floppy disk, tape), optical storage (e.g., CD-ROM, DVD-ROM, optical disk, etc.), volatile and non-volatile memory device [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, computer accessible signals propagating through space, computer accessible radio waves, computer accessible infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed. Furthermore, program logic that includes code may be implemented in hardware, software, firmware or any combination thereof. The described operations of FIGS. 1-8 may be performed by a processor or circuitry, where "circuitry" refers to either hardware or software or a combination thereof. The circuitry for performing the operations of the described embodiments may comprise a hardware device, such as an integrated circuit chip, a PGA, an ASIC, etc. The circuitry may also comprise a processor component, such as an integrated circuit, and code in a computer readable medium, such as memory, wherein the code is executed by the processor to perform the operations of the described embodiments.

Figure 7:
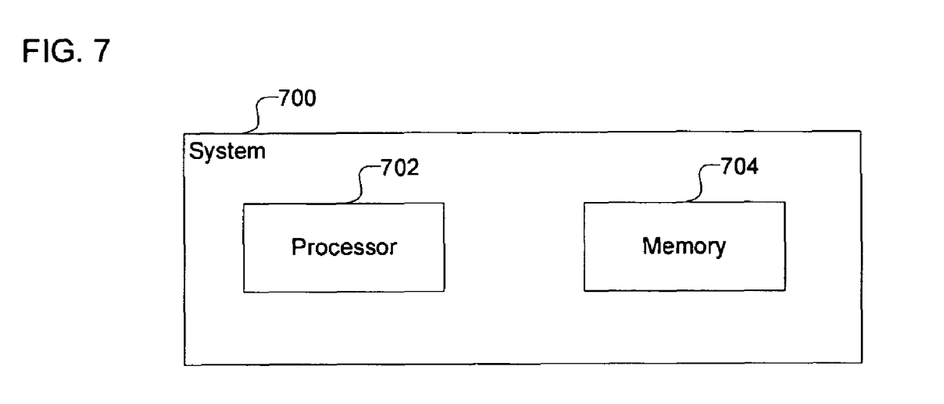
FIG. 7 illustrates a block diagram of a first system including certain elements of the computing environment of FIG. 1, in accordance with certain embodiments.

Certain embodiments illustrated in FIG. 7 may implement a system 700 comprising a processor 702 coupled to a memory 704, wherein the processor 702 is operable to perform the operations described in FIGS. 5-6.

Figure 8:
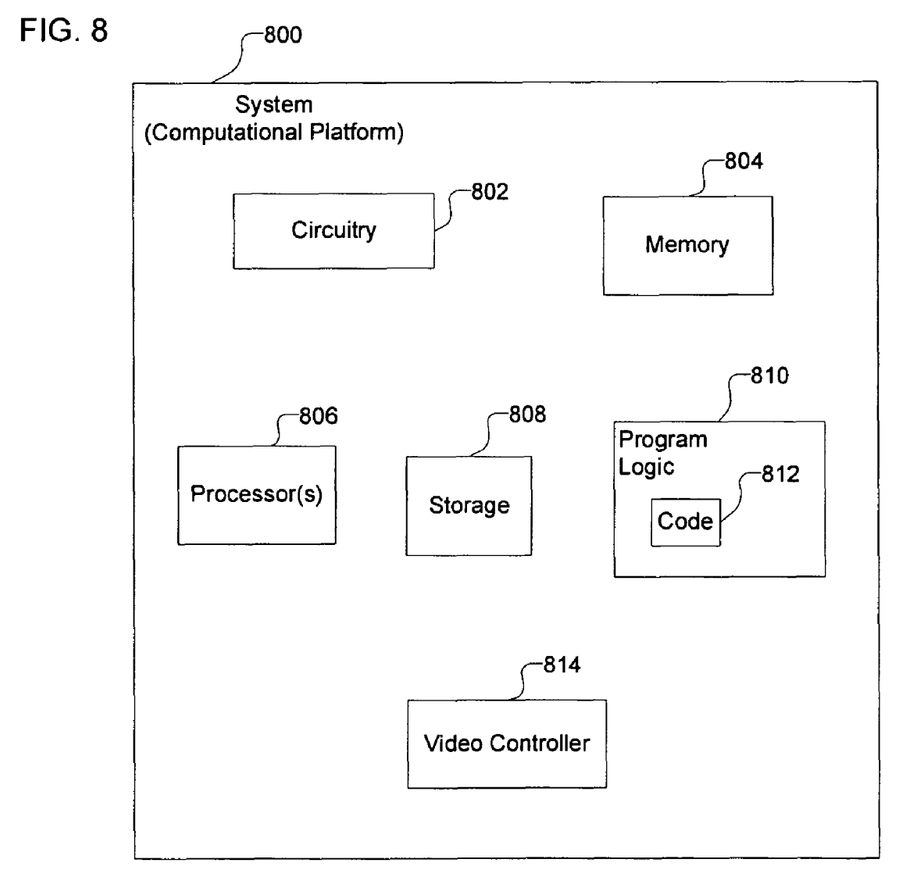
FIG. 8 illustrates a block diagram of a second system including certain elements of the computing environment of FIG. 1, in accordance with certain embodiments.

FIG. 8 illustrates a block diagram of a system 800 in which certain embodiments may be implemented. Certain embodiments may be implemented in systems that do not require all the elements illustrated in the block diagram of the system 800. The system 800 may include circuitry 802 coupled to a memory 804, wherein the described operations of FIGS. 5-6 may be implemented by the circuitry 802. In certain embodiments, the system 800 may include a processor 806 and a storage 808, wherein the storage 808 may be associated with program logic 810 including code 812, that may be loaded into the memory 804 and executed by the processor 806. In certain embodiments the program logic 810 including code 812 is implemented in the storage 808. In certain embodiments, the operations performed by program logic 810 including code 812 may be implemented in the circuitry 802. Additionally, the system 800 may also include a video controller 814. The operations described in FIGS. 5-6 may be performed by the system 800.

Certain embodiments may be implemented in a computer system including a video controller 814 to render information to display on a monitor coupled to the system 800, where the computer system may comprise a desktop, workstation, server, mainframe, laptop, handheld computer, etc. An operating system may be capable of execution by the computer system, and the video controller 814 may render graphics output via interactions with the operating system. Alternatively, some embodiments may be implemented in a computer system that does not include a video controller, such as a switch, router, etc. Also, some embodiments may be implemented in a computer system where the video controller does not have the capability of rendering graphics output but has the capability of rendering text output. Furthermore, in certain embodiments the device may be included in a card coupled to a computer system or may be on a motherboard of a computer system.

Certain embodiments may be implemented in a computer system including a storage controller, such as, a Small Computer System Interface (SCSI), AT Attachment Interface (ATA), Redundant Array of Independent Disk (RAID), etc., controller, that manages access to a non-volatile storage device, such as a magnetic disk drive, tape media, optical disk, etc. Certain alternative embodiments may be implemented in a computer system that does not include a storage controller, such as, certain hubs and switches.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

The data structures and components shown or referred to in FIGS. 1-8 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

\- - -

\* MICROSOFT WINDOWS is a trademark or registered trademark of Microsoft Corporation.

\* UNIX is a trademark or registered trademark of the Open Group.

\* LINUX is a trademark or registered trademark of Linus Torvalds.

What is claimed is:

1. A method, comprising:
   requesting, by a debugger, an operating system to monitor a memory address, wherein the debugger sets a protection for a page that includes the memory address, and wherein the operating system generates a signal in response to an operation that affects the memory address;
   receiving, by a runtime application from the operating system, the signal generated by the operating system;
   determining, by the runtime application, whether to forward the signal received from the operating system to the debugger;
   forwarding, by the runtime application, the signal received from the operating system to the debugger, in response to determining by the runtime application that the signal could have been caused by a violation of the protection for the page set by the debugger; and
   processing, by the debugger, the signal, in response to the signal being forwarded by the runtime application to the debugger, wherein the method further comprises:
   setting, by the debugger, a first type of protection on a page that includes the memory address;
   setting, by the runtime application, a second type of protection on the page that includes the memory address, wherein the runtime application installs a signal handler to receive segmentation violation signals from the operating system;
   determining, whether the first type of protection set by the debugger or the second type of protection set by the runtime application is a more restrictive protection; and
   setting, in an operating system page permission table, the more restrictive protection on the page that includes the memory address.

2. The method of claim 1, wherein the determining by the runtime application whether to forward the signal to the debugger further comprises:
   determining whether the signal could have been caused by a violation of another protection for the page set by the runtime application.

3. The method of claim 1, further comprising:
   receiving, by the runtime application, all signals caused by a segmentation violation of the page that includes the memory address; and
      forwarding, by the runtime application, to the debugger those signals that have been caused by a violation of the protection set on the page by the debugger.

4. The method of claim 1, further comprising:
   directly receiving, by the debugger, the signal from the operating system; and
   avoiding processing, by the debugger, the directly received signal from the operating system.

5. The method of claim 1, further comprising:
   setting, by the debugger, a breakpoint in the runtime application, wherein a triggering of the breakpoint causes the runtime application to forward the signal to the debugger application; and
   initiating, by the debugger, a debugging of a debuggee application by starting an execution of the debuggee application in an environment provided by the runtime application.

6. The method of claim 1, wherein the debugger allows a watchpoint to be set and deleted in a debuggee application.

7. A system, comprising:
   memory;
   processor coupled to the memory;
   an operating system coupled to the memory;
   a debugger coupled to the memory; and
   a runtime application coupled to the memory, wherein the processor is operable to:
      allow the debugger to request the operating system to monitor a memory address, wherein the debugger sets a protection for a page that includes the memory address, and wherein the operating system generates a signal in response to an operation that affects the memory address;
      allow the runtime application to receive from the operating system, the signal generated by the operating system;
      allow the runtime application to determine whether to forward the signal received from the operating system to the debugger;
      allow the runtime application to forward the signal received from the operating system to the debugger, in response to determining by the runtime application that the signal could have been caused by a violation of the protection for the page set by the debugger; and
      allow the debugger to process the signal, in response to the signal being forwarded by the runtime application to the debugger, wherein the processor is further operable to:
      allow the debugger to set a first type of protection on a page that includes the memory address;
      allow the runtime application to set a second type of protection on the page that includes the memory address, wherein the runtime application installs a signal handler to receive segmentation violation signals from the operating system;

allow a determination of whether the first type of protection set by the debugger or the second type of protection set by the runtime application is a more restrictive protection; and allow setting, in an operating system page permission table, the more restrictive protection on the page that includes the memory address.

8. The system of claim 7, wherein the processor is further operable to allow the runtime application to determine whether the signal could have been caused by a violation of another protection for the page set by the runtime application.

9. The system of claim 7, wherein the processor is further operable to allow the runtime application to receive all signals caused by a segmentation violation of the page that includes the memory address, and wherein the processor is further operable to allow the runtime application to forward to the debugger those signals that have been caused by a violation of the protection set on the page by the debugger.

10. The system of claim 7, wherein the processor is further operable to allow the debugger to directly receive the signal from the operating system, and wherein the processor is further operable to allow the debugger to avoid processing the directly received signal from the operating system.

11. The system of claim 7, further comprising:
a debuggee application coupled to the memory, wherein the processor is further operable to allow the debugger to set a breakpoint in the runtime application, wherein a triggering of the breakpoint causes the runtime application to forward the signal to the debugger application, and wherein the processor is further operable to allow the debugger to initiate a debugging of the debuggee application by starting an execution of the debuggee application in an environment provided by the runtime application.

12. The system of claim 7, further comprising:
a debuggee application coupled to the memory, wherein the processor is further operable to allow the debugger to set and delete a watchpoint in the debuggee application.

13. An article of manufacture, comprising a storage medium having stored therein instructions capable of being executed by a machine to:
request, by a debugger, an operating system to monitor a memory address, wherein the debugger sets a protection for a page that includes the memory address, and wherein the operating system generates a signal in response to an operation that affects the memory address;
receive, by a runtime application from the operating system, the signal generated by the operating system;
determine, by the runtime application, whether to forward the signal received from the operating system to the debugger;
forward, by the runtime application, the signal received from the operating system to the debugger, in response to determining by the runtime application that the signal could have been caused by a violation of the protection for the page set by the debugger; and
process, by the debugger, the signal, in response to the signal being forwarded by the runtime application to the debugger, wherein the instructions are further capable of being executed by the machine to:
set, by the debugger, a first type of protection on a page that includes the memory address;
set, by the runtime application, a second type of protection on the page that includes the memory address, wherein the runtime application installs a signal handler to receive segmentation violation signals from the operating system;
determine, whether the first type of protection set by the debugger or the second type of protection set by the runtime application is a more restrictive protection; and
set, in an operating system page permission table, the more restrictive protection on the page that includes the memory address.

14. The article of manufacture of claim 13, wherein the instructions are further capable of being executed by the machine to:
determine whether the signal could have been caused by a violation of another protection for the page set by the runtime application.

15. The article of manufacture of claim 13, wherein the instructions are further capable of being executed by the machine to:
receive, by the runtime application, all signals caused by a segmentation violation of the page that includes the memory address; and
forward, by the runtime application, to the debugger those signals that have been caused by a violation of the protection set on the page by the debugger.

16. The article of manufacture of claim 13, wherein the instructions are further capable of being executed by the machine to:
directly receive, by the debugger, the signal from the operating system; and
avoid processing, by the debugger, the directly received signal from the operating system.

17. The article of manufacture of claim 13, wherein the instructions are further capable of being executed by the machine to:
set, by the debugger, a breakpoint in the runtime application, wherein a triggering of the breakpoint causes the runtime application to forward the signal to the debugger application; and
initiate, by the debugger, a debugging of a debuggee application by starting an execution of the debuggee application in an environment provided by the runtime application.

18. The article of manufacture of claim 13, wherein the debugger allows a watchpoint to be set and deleted in a debuggee application.

* * * * *